June 28, 1955  J. G. SQUARCIO  2,711,688
LEMON SLICE HOLDER AND SQUEEZING DEVICE
Filed Oct. 29, 1951
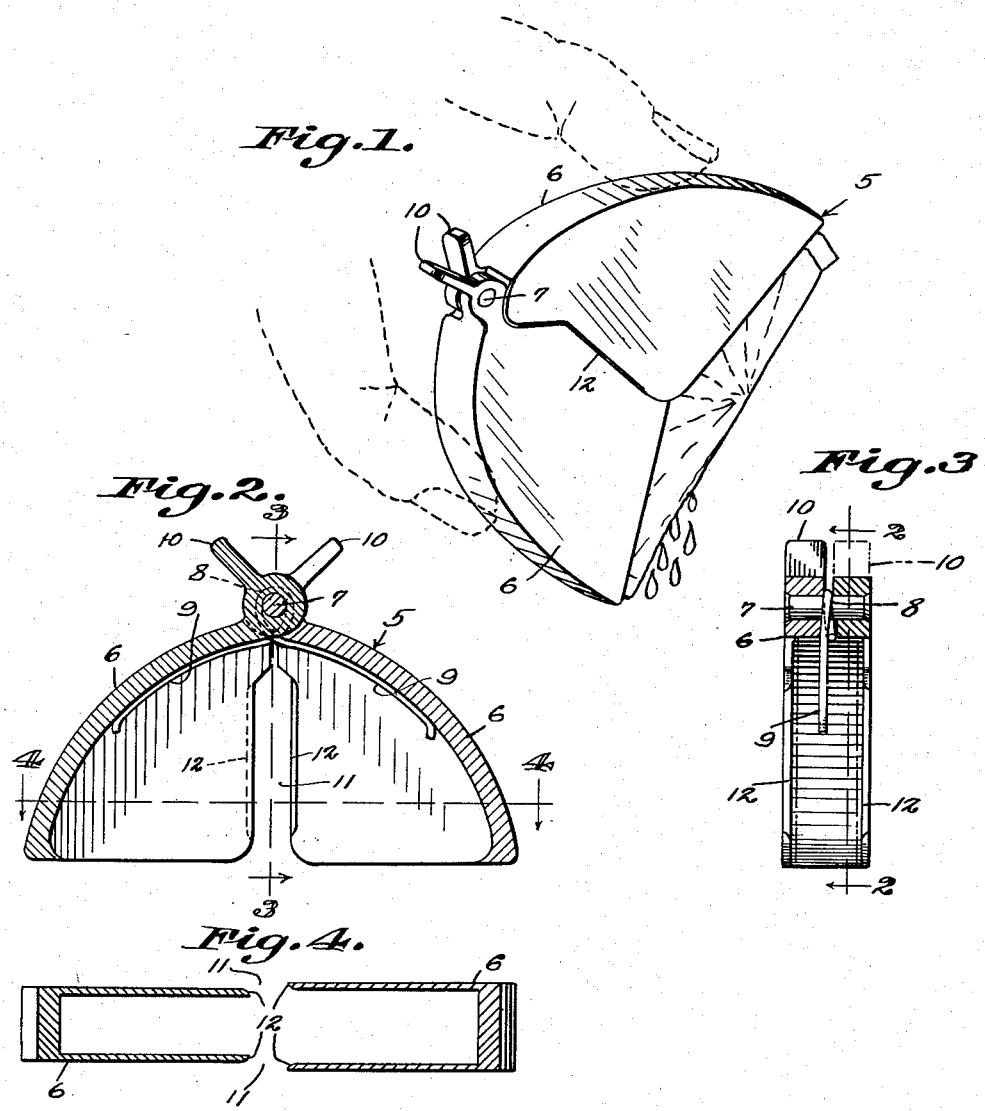
Inventor
Joseph G. Squarcio

United States Patent Office 2,711,688
Patented June 28, 1955

2,711,688

LEMON SLICE HOLDER AND SQUEEZING DEVICE

Joseph G. Squarcio, Denver, Colo.

Application October 29, 1951, Serial No. 253,667

1 Claim. (Cl. 100—234)

This invention relates to a device for use in squeezing individual lemon slices used primarily for squeezing the juice from lemon slices for application to iced tea, cups of hot tea, or as a matter of fact wherever it is found desirable to provide fresh lemon juice.

An important object of the invention is to provide a lemon squeezer of this character, shaped to conform to the shape of a lemon slice, which will completely cover the side faces and rear curved surfaces of lemon slices, to the end that when the lemon juice is squeezed from the lemon slice the lemon juice will pass directly through the open side of the lemon squeezer, thereby eliminating the possibility of the lemon juice passing over the fingers of the person squeezing the lemon slice.

Still another object of the invention is to provide a combined lemon slice holder and squeezer, which may be employed as a means for serving a lemon slice with beverages in which lemon juice is sometimes used, so that the slice of lemon will be protected against foreign matter during serving.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a perspective view illustrating a combined lemon slice holder and squeezer, illustrating a slice of lemon positioned therein, as partially squeezed.

Fig. 2 is a longitudinal sectional view through the device taken on line 2—2 of Fig. 3.

Fig. 3 is a sectional view taken on line 3—3 of Fig. 2.

Fig. 4 is a sectional view on line 4—4 of Fig. 2.

Referring to the drawing in detail, the combined lemon slice holder and squeezing device comprises a body indicated generally by the reference character 5, the body being curved in the arc of a circle and of a general construction to accommodate one-half of a slice of lemon in such a way that the lemon slice may be substantially encased in the body with the exception of one edge of the lemon slice.

The body comprises pivotally connected sections 6, connected by the pivot pin 7, there being provided a spring 8 wrapped around the pivot pin with its ends 9 resting against the inner surfaces of the sections 6, as clearly shown by Fig. 3 of the drawing. Finger pieces 10 extend outwardly from the pivoted ends of the sections 6 and are inclined in opposite directions so that when the finger pieces 10 are gripped and moved towards each other, the sections 6 will be moved apart to permit a lemon slice to be positioned therein.

As shown, the adjacent edges of the sections 6 are cut away providing spaces 11 at opposite sides of the body providing clearance for the positioning of the fingers against the lemon slice to remove the same, the adjacent edges of the sections 6 being beveled at 12 so that one section will be guided over the other section when the pivotally connected sections are forced towards each other in squeezing the juice from a lemon slice.

From the foregoing it will be seen that due to the construction shown and described, I have provided a combined lemon slice holder and squeezing device in which a slice of lemon may be positioned and served with a beverage, the device being operable to squeeze the lemon juice from the slice eliminating any possibility of the lemon juice passing over the fingers of the person squeezing the device.

Having thus described the invention, what is claimed is:

A holder for holding and squeezing individual lemon slices comprising a semi-circular hollow body including a pair of telescoping hollow sections of substantially triangular shape, pivotally connected at one of their respective apices, the adjacent inner edges of said connected sections being cut away providing clearances, said edges being beveled providing guiding surfaces for guiding one section over the other section when the sections are moved together in squeezing a lemon slice within the body, and finger pieces extending from the connected sections for effecting movement of the sections to their open positions.

References Cited in the file of this patent

UNITED STATES PATENTS

| | | |
|---|---|---|
| 230,985 | Armstrong | Aug. 10, 1880 |
| 296,940 | Didout | Apr. 15, 1884 |
| 946,668 | Filler | Jan. 18, 1910 |
| 995,286 | Pender | June 13, 1911 |
| 1,842,603 | Gray | Jan. 26, 1932 |
| 2,446,432 | Plaxco | Aug. 3, 1948 |

FOREIGN PATENTS

| | | |
|---|---|---|
| 68,639 | Switzerland | July 1, 1915 |